May 19, 1931.  G. E. JANSSON  1,806,351
HIGH TENSION DIRECT CURRENT TRANSMISSION
Filed July 15, 1927  2 Sheets-Sheet 1
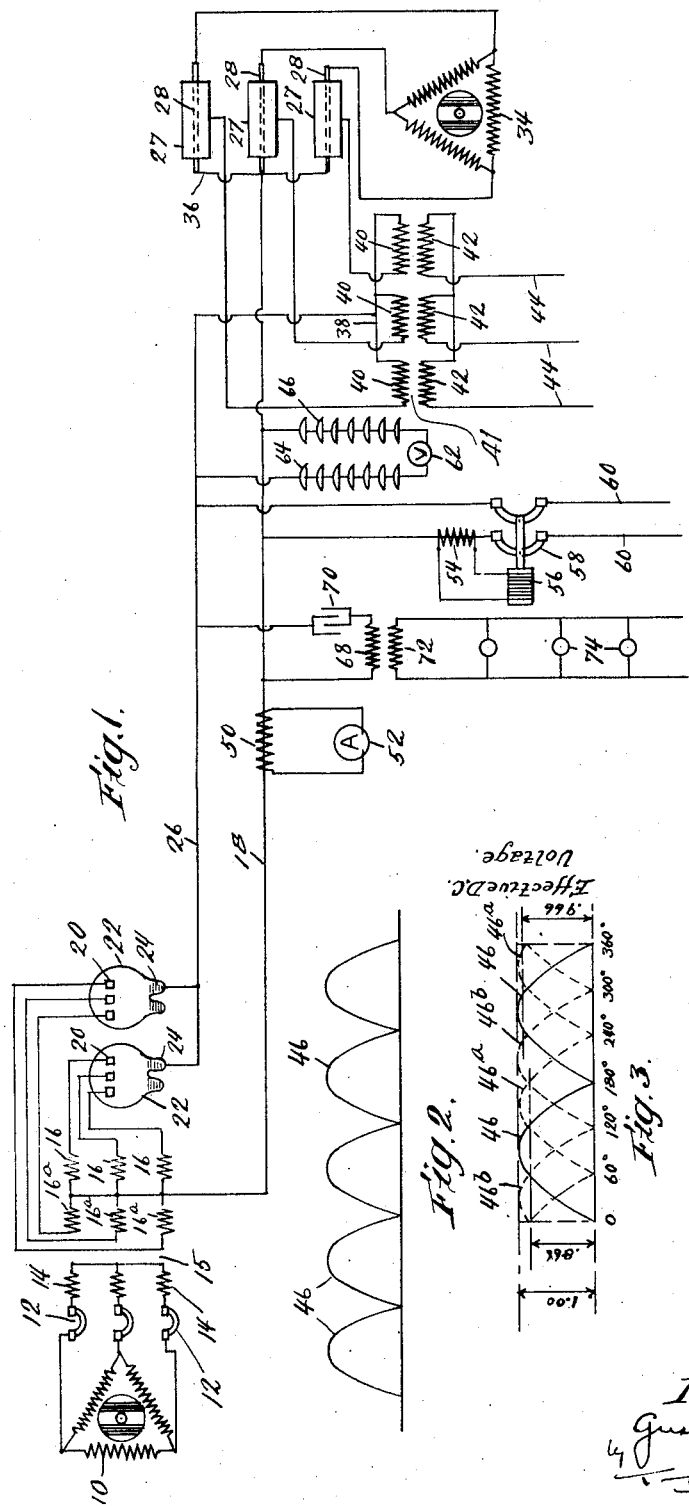
Inventor.
Gustav E. Jansson
by _____ atty.

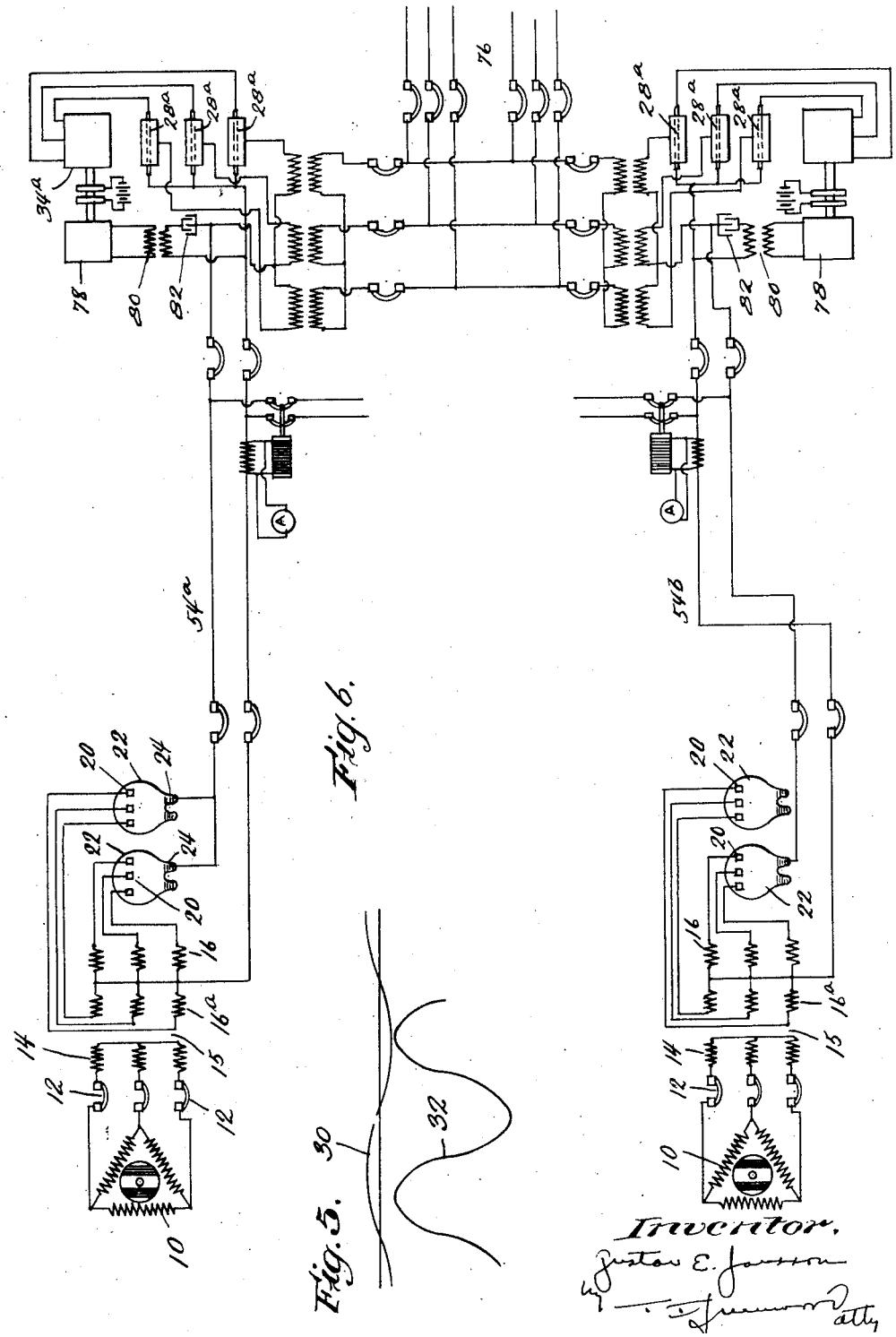

Patented May 19, 1931

1,806,351

UNITED STATES PATENT OFFICE

GUSTAV E. JANSSON, OF WOLLASTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

HIGH TENSION DIRECT CURRENT TRANSMISSION

Application filed July 15, 1927. Serial No. 206,070.

This invention relates to electric high tension generating and distributing systems.

Electric power in large amounts is now practically universally transmitted over transmission lines as high tension alternating current. As the demand for power grows, and for the transmission of power to greater distances from the generating center, there is a constant tendency to increase the voltage of transmission in order to transmit the large amount of power increased distances economically. Increasing the tension of an alternating current transmission line, however, introduces serious difficulties which restrict the distance to which alternating current power can be transmitted economically. The charging current of the long high tension line, for instance, may be very great and there have been instances where the current in the line with the power consuming devices at the remote end thereof disconnected was greater than the current in the line when supplying power to the consuming devices. The insulation of a high tension line becomes a difficult problem and the insulators are subject to failure due to losses therein caused by the alternating electric stress to which they are subjected. Corona is another serious trouble since corona depends upon the peak voltage and not upon the mean effective voltage. As a remedy for these and other troubles, it has been proposed to generate alternating current at high tension and to convert the alternating current into the direct current and transmit the direct current at high tension over the high tension line and use it at the consuming end either as a direct current at high tension or to convert it into alternating current at lower tension and use it as such.

It has been considered necessary in rectifying the high tension alternating current for this purpose to have the direct current potential as uniform and unvarying as possible, approaching the uniformity of a direct current generator, thus to avoid some of the troubles experienced with alternating current. To this end, the alternating current has been supplied in a large number of phases, say forty or fifty phases so that the rectified current will be to all intents and purposes uniform. While the transmission of such high tension direct current eliminates many of the troubles present with high tension alternating current transmission, it introduces other difficulties. With high tension alternating current transmission, it is a well recognized and desirable practice to take small amounts of power at high tension from the high tension line to operate switching or auxiliary apparatus of the high tension line or for branch lines connected therewith and to supply energy for measuring devices for ammeters and volt-meters that indicate the condition of the high tension line. It is also desirable, under some conditions, to draw small amounts of power from the high tension line for lighting purposes, as, for instance, for the street lights of small communities through which the transmission line passes and for the control stations of the high tension lines. It is highly impracticable and unadvisable to draw small amounts of power from a high tension direct current transmission line for there is no convenient means for reducing the potential of the line. It is true that resistors can be used but it is not desirable to do so for obvious reasons since the high potential on open circuit is still applied to the terminal of the resistor and, furthermore, the major proportion of the power passing through the resistor is dissipated in heating it.

With high tension alternating current transmission systems, it is also common practice for several high tension lines to deliver power into a common low tension alternating current net work, wherein the frequency of the net work is controlled by one or more of the generating stations feeding the high tension lines. This can not be done with high tension direct current transmission since the frequency of the high tension alternating current at the generating station can not control the frequency of the low tension alternating current power consuming net work over the direct current transmission line.

It is an object of this invention to provide a high tension direct current, generating, transmitting and distributing system wherein the advantages of the high tension direct current transmission are realized and many of the disadvantages such as these above enumerated are obviated.

In accordance with this invention, I propose to generate the electric power as high tension alternating current power and to rectify the current for transmission as high tension direct current, but, instead of endeavoring to maintain an absolute uniform and unvarying direct potential, I propose to convert the alternating current into direct current in such a manner that the potential thereof fluctuates in some small degree so that the effect is of small alternating current superimposed upon the direct current of the transmission line; and this constitutes a further object of the invention.

In carrying out this object of the invention, I prefer to generate a three phase high tension alternating current and rectify this current to obtain a high tension direct current. Since the voltages of the three phases are superimposed upon each other in phase-displaced relation, there exists superimposed upon the direct potential, if the full wave is rectified, an undulatory potential or ripple which has a frequency of six times the frequency of the generated alternating potential and an amplitude of about 7% of the mean effective value of the direct potential.

In accordance with this invention, I plan to use this undulatory component to supply small amounts of alternating current power to auxiliary power consuming devices associated with the high tension direct current line through the use of, preferably, step-down transformers of more or less ordinary construction. I thus have available for use, due to this undulatory component, an alternating current power in the high tension direct current line which may have a value of about 15% of the total power in the line, which alternating current power is ample to operate the auxiliary low tension devices and circuits essential or desirable to the control of the line.

According to this invention, I also plan to control the frequency of the low tension alternating current output of the system by the undulatory component or alternating current ripple of the direct current in the line, thus to control the frequency of the low tension output by the frequency of the generated alternating current power. I thus am enabled to operate a low tension alternating current power consuming net work fed through a direct current transmission line in the same manner as is now common with high tension alternating current transmission.

Fig. 1 is a diagrammatic representation of a high tension alternating current generating and consuming system employing high tension direct current transmission according to this invention.

Fig. 2 is a representation of a rectified full-wave of one of the phases of the generated high tension alternating current.

Fig. 3 is a diagram illustrating the manner in which the rectified waves of the three phases combine to form an undulatory direct current.

Fig. 4 is a diagrammatic view illustrating the character of the direct current transmitted in the high tension direct current line according to this invention.

Fig. 5 is a diagram illustrating the conversion of the high tension direct current to alternating current at the low tension distribution and voltage step-down end of the system.

Fig. 6 is a diagram similar in general aspects to Fig. 1 but illustrating two high tension direct current systems embodying this invention which feed a common alternating current net work wherein the frequency of the net work is governed by the frequency of the alternating power supplied at the generating end of the system.

In carrying out this invention, and referring to Fig. 1, I employ a three-phase alternating current low tension generator 10 of any usual or suitable construction, here shown diagrammatically as a rotating field alternator, which is connected through suitable switches 12 with the primaries 14 of high tension transformers 15. The high tension secondaries 16 and 16a of the transformers have similar terminals connected together and to a line 18 which forms one side (the negative side) of the high tension direct current transmission line. The other terminals of said secondaries are separately connected with the anodes 20 of a pair of mercury arc rectifiers 22. The mercury cathodes 24 are connected to a line 26 which constitutes the other and positive side of the high tension direct current transmission line. The mercury arc rectifier is too well known to need further description. This arrangement provides for full wave rectification although other well known methods and apparatus, not necessarily illustrated, can be employed when desirable.

At the receiving end, the high tension direct current is converted into low tension alternating current. The converter may be of any desirable construction. I have here illustrated the use of magnetrons as the converters. A magnetron comprises essentially a metal anode 27 usually of tubular form and an axially disposed filament 28 with the space between the anode and filament highly evacuated. When a circumferentially-directed magnetic field occupies the space between the filament and anode or plate and is of sufficient magnitude, conduction between the plate and filament is hindered and when the field is reduced in intensity conduction is permitted. If the filament current is sufficiently strong, the magnetic field surrounding the filament is sufficient in itself to control the flow of current between the anode and filament. By feeding the filament with a sufficiently strong alternating current, conduction between the anode and the filament can be permitted and hindered alternately and the direct current will flow only as controlled by the frequency of the filament supply so that a pulsating direct current flows in the anode circuit and can be converted to a pure alternating current in the secondary of a transformer.

Fig. 5 illustrates the current conditions wherein the sinusoidal wave 30 represents the alternating current in a filament 28 and the wave 32 represents the resultant flow of direct current in the anode circuit. It will be noted that the frequency of the current undulations in the anode circuit is twice that of the frequency of the filament supply.

The filaments are supplied with current from a suitable source, as a three phase generator 34 which may be operated at any frequency although if the low tension alternating current distribution line is to be operated at sixty cycles the generator 34 will be a thirty cycle generator. The negative side 18 of the high tension transmission line is connected to the common connection 36 between the filaments. The positive side 24 of the line is connected to the common junction 38 of the primary windings 40 of stepdown output transformers 41. The other terminal of each of the transformer primaries is connected to one of the anodes 27 of the magnetrons. As thus arranged a three-phase alternating current will be set up in the low tension secondary windings 42 of the output transformers and in the three-phase low tension distribution lines 44.

In accordance with this invention, the high tension direct current is provided with an undulatory component from which a small amount of alternating current power can be obtained. This undulatory component is provided by the manner of rectifying the high tension alternating current supplied by the generator 10. Fig. 2 illustrates a rectified full-wave 46 of one of the sets of transformer secondaries 16 and 16a. The rectified full-waves 46, 46a, 46b, Fig. 3, of the three phases combine in the transmission line to provide a direct current having an undulatory component or ripple 48 as indicated in Fig. 4 which is formed by the crests of the waves 46, 46a, and 46b and has a frequency which is six times the frequency of the initial alternating current.

With this undulatory component, the maximum or peak, however, of the direct current will be about 3½% higher than the mean effective value. Corona will thus form somewhat earlier than it would if the wave were absolutely uniform but the difference is so slight as to be negligible in practice since barometric fluctuations may have a greater influence on corona formation. The transmission line, when open at the receiving end, will have some charging current due to the undulatory component but since the amplitude of the component is small, being less than 10% of the mean effective value of the direct current, with an initial three phase current, the charging current will be small and will not deleteriously effect the system. It will be apparent that the frequency of the undulatory component can be made anything desirable by suitably selecting the frequency of the generator 10. If the generator is a sixty cycle generator then the undulatory component will have a frequency of 360 cycles. If for any reason it is desirable to operate on a less frequency than this, the generator 10 can be properly chosen to produce an undulatory component of the desired frequency. Low frequency alternating current generators, say twenty cycle generators, can advantageously be used, with a consequent improvement in power factor between the generator and high tension direct current line and will provide a 180 cycle alternating current component, assuming full wave rectification. The use of such low frequency also keeps down the value of what little charging current there may be in the direct current line.

By the use of a high tension direct current having an undulatory component which is in effect a superimposed alternating current, I am enabled to derive low tension alternating current power directly from the direct current high tension line by the use of transformers of more or less ordinary design and construction, something which can not be done with any proposed high tension direct current system of which I am aware.

In Fig. 1 I have illustrated a current transformer 50, the primary of which is directly included in the high tension direct current line and the low tension secondary of which supplies an ammeter 52 for indicating the current in the direct current line. While the ammeter is affected only by the undulatory component of the direct current this component varies substantially in accordance with the direct current so that the ammeter reading follows the rise and fall of and can be calibrated to read in terms of the direct current. I have also illustrated another current transformer 54 for energizing the tripping coil 56 of a switch 58 which controls a high tension direct current branch feeder circuit 60 to open this circuit on overload. I have also shown a volt meter 62 for measuring the voltage of the line, the volt meter being connected between two strings 64 and 66 of insulators connected across the transmission line. The meter, in effect, measures the charging current in the insulators due to the undulatory component of the direct current voltage. Since, however, the amplitude of the undulatory component follows the variation of direct current voltage, the volt meter 62 can be calibrated to read directly in terms of the direct current voltage. In many instances, it is desirable to derive small amounts of power from the direct current transmission line for supplying street lights, for instance, in small communities through which the line passes. This can not be done with convenience and safety from high tension direct current having the usual characteristics. With a current having an undulatory component according to this invention, this can readily be done and I have shown a step-down alternating current transformer having a primary winding 68 connected through a condenser 70 across the high tension line. The low tension secondary 72 of the transformer can feed a series of lamps 74 or other alternating current power-consuming devices. The condenser 70 will not permit the direct current to flow through the transformer but will permit the undulatory component thereof to pass and consequently an alternating current of suitable power will be set up in the secondary 72.

Fig. 6 illustrates a low tension alternating current net work 76 which is fed by a plurality of high tension direct current lines 54a and 54b, two being here shown, with the frequency of the net work controlled from the main alternating current generators. Frequency regulation of the alternating current net work 76 is governed by the alternating current ripple of the direct current in the high tension lines, by using the alternating current ripple to operate the alternating current generator for heating the filaments of the magnetron converters. As here shown, the low frequency alternating current generator 34a for heating the filaments 28a of the magnetrons is driven by a synchronous motor 78 which derives its power from a step-down transformer 80 connected across the high tension direct current lines 54a through a condenser 82. The condenser prevents the flow of direct current through the transformer but lets through the alternating current ripple and thus there is generated in the low tension side of the transformer sufficient alternating current power to operate the synchronous motor 78. This motor operates at a speed which is governed directly by the frequency of the alternating current ripple and thus is governed by the speed of the power generator 10. Since the filament heating generator 34a is directly coupled with the synchronous motor 78 it follows that the frequency in the net work 76 must follow and be controlled by the frequency of the alternating current generator 10. If the fundamental frequency of the generator 10 is sixty cycles and the frequency of the net work 76 is required to be sixty cycles then it follows that since the alternating current ripple in the high tension line is 360 cycles and that the generator 34a must generate current at 30 cycles the number of poles in the synchronous motor 78 must be such as to produce the proper speed reduction for driving the rotor of the generator 34a. It is, of course, apparent that the frequency of the net work can be something different from the frequency of the generator 10 and yet have the frequency of the net work controlled by the generator.

It is thus apparent that, by this invention, I have provided for the transmission of high tension electric power to great distances without the troubles and difficulties now experienced and with all the advantages now realized in high tension alternating current transmission.

I claim:

1. The method of generating and transmitting electric power which consists in generating a multi-phase alternating current, rectifying the alternating current at high tension to form a high tension direct current having an undulatory component the magnitude of which varies in accordance with variations in the condition of the direct potential, transmitting such direct current at high tension over a high tension line, and abstracting small amounts of power from the undulatory component only of said direct potential of said high tension direct current transmission line.

2. The method of generating and distributing electric power which consists in rectifying a high tension multi-phase alternating current to provide a rectified high tension direct current, the number of phases of the alternating current being so selected that the rectified direct current voltage has a superimposed undulatory voltage component of relatively small magnitude which varies in accordance with variations in the condition of the direct current voltage, transmitting such high tension direct current over a transmission line, and abstracting small amounts of power directly from the undulatory voltage component only of the high tension transmission line.

3. The method of generating electric power which consists in rectifying a three-phase high tension alternating current to provide a high tension direct current which has a superimposed undulatory potential component, the frequency of which is a function of the product of the frequency and the number of phases of the alternating current potential and the magnitude of which varies in accordance with variations in the condition of the direct potential, and abstracting small amounts of power from the undulatory potential component only of the high tension line.

4. The method of deriving small amounts of alternating power from a high tension direct current transmission line which consists in supplying to the transmission line a high tension direct current having a small alternating current component, the magnitude of which varies in accordance with variations in the condition of the direct potential by rectifying a high tension alternating current of relatively few phases to form the above characterized direct potential, and deriving power from the undulatory potential component only of the high tension direct current line.

5. The method of measuring a condition of a high tension direct current which consists in supplying the direct current having an alternating current component, the magnitude of which varies in accordance with variations in the condition of the direct current, and operating with such high tension current a condition-indicating device responsive to variations of the alternating current component of the direct current.

6. The method of measuring the voltage of a high tension direct current transmission line which consists in supplying the line with high tension direct current having a small alternating voltage component the amplitude of which varies in accordance with the variation of voltage of the direct current and measuring the variation of the alternating voltage component in terms of the variation of the direct current voltage.

7. The method of deriving small amounts of power from a high tension direct current line which consists in supplying the line with high tension direct current having a small alternating current component the magnitude of which varies in accordance with variations in the condition of the direct potential, and abstracting alternating current inductively from the alternating current component of said line.

8. The method of generating, transmitting, and distributing electric power which consists in generating alternating current, converting the alternating current to high tension direct current and transmitting the direct current, converting the high tension direct current to a lower tension alternating current and distributing the alternating current, and regulating the frequency of the low tension alternating current by the frequency of the generated alternating current by transmitting a small-amplitude alternating current along with the high tension direct current and controlling the frequency of the distributed alternating current by the transmitted alternating current component.

9. An electric power net work comprising a plurality of independent sources of alternating current power combined with means to rectify the alternating current to form high tension direct current, a plurality of high tension direct current transmission lines connected with said sources of power, converters at the ends of the high tension direct current transmission lines for converting the direct current power to alternating current power, a common alternating current distribution net work supplied with alternating current energy from said converters, and means for controlling the frequency of the alternating current of said net work over one of said transmission lines from its source of alternating current power.

10. A high tension direct current transmission line having generating means to supply to the line high tension direct current having a small undulatory potential component the magnitude of which varies in accordance with variations in the condition of the direct potential, and an auxiliary alternating current power consuming device having an inductive connection with the transmission line whereby it is operated by the undulatory potential component in the line.

11. The method of transmitting electric power at high tension which consists in supplying a transmission line with high tension direct current having a small alternating current component of a commercial frequency the magnitude of which varies in accordance with variations in the condition of the direct current, and controlling the direct current power by the alternating current component thereof.

12. The method of transmitting electric power at high tension which consists in supplying a transmission line with high tension direct current having a small alternating current component of a commercial frequency the magnitude of which varies in accordance with variations in the condition of the direct current and converting the direct current to alternating current and utilizing the frequency of the alternating current component of the direct current to control the frequency of the converted direct current.

13. A transmission line supplied with high tension direct current having a small alternating current component the magnitude of which varies in accordance with variations in the condition of the direct current, and an alternating current responsive device operated by the alternating current component only of said high tension direct current.

14. The method of transmitting and utilizing electric power at high tension which consists in supplying a transmission line with a high tension direct current having a superimposed alternating current component and the magnitude of which varies in accordance with variations in the condition of the direct potential, and abstracting power from said alternating current component.

15. The method of transmitting power from an alternating current power source over long distances which consists in supplying multi-phase alternating current power at a high potential, converting the multi-phase high potential current to a high potential direct current having a superimposed alternating current of some small magnitude, transmitting such high potential direct current over a direct current transmission line, utilizing the alternating current component of current for energizing alternating current apparatus along the line, and converting the high potential direct current to low tension alternating current and utilizing the alternating current component of the direct current to control the frequency of the low tension alternating current.

16. A power generating and distributing system including a transmission line extended between remote points, a source of multi-phase high tension alternating current connected to said line at one end thereof, rectifying means to convert said high tension alternating current to a high tension direct current having a superimposed alternating current component of small magnitude, and converting means disposed at the remote end of said transmission line to convert said high tension direct current to a low tension alternating current including means influenced by said superimposed alternating current component to control the frequency of said low tension alternating current.

17. The combination of a high tension direct current transmission line, means to supply to the line a high tension direct current having a small alternating current component, the magnitude of which varies in accordance with variations in the direct current potential, a circuit breaker in said line, and means operated only by the alternating component of the direct current supply to open the breaker.

18. An electric generating and distribution system including a multi-phase, high tension alternating source of electric power, a converter for changing the alternating power into direct power at a direct voltage having an undulatory component which is a function of the direct voltage, a transmission line into which the converter feeds, and a power-consuming device connected with said line and responsive to the undulatory voltage component only thereof.

In testimony whereof, I have signed my name to this specification.

GUSTAV E. JANSSON.